United States Patent [19]

Brown

[11] 4,392,356
[45] Jul. 12, 1983

[54] MAGNETIC HEAT PUMPING

[75] Inventor: Gerald V. Brown, Lakewood, Ohio

[73] Assignee: The United States of America as represented by the Administrator of the National Aeronautics and Space Administration, Washington, D.C.

[21] Appl. No.: 235,868

[22] Filed: Feb. 19, 1981

Related U.S. Application Data

[63] Continuation of Ser. No. 829,319, Aug. 31, 1977, abandoned.

[51] Int. Cl.$^3$ ............................................. F25B 21/02
[52] U.S. Cl. ......................................................... 62/3
[58] Field of Search ............................................. 62/3

[56] References Cited

U.S. PATENT DOCUMENTS

| | | | |
|---|---|---|---|
| 2,589,775 | 3/1952 | Chilowsky | 62/3 |
| 2,619,603 | 11/1952 | Chilowsky | 62/3 X |
| 3,790,829 | 2/1974 | Roth | 62/3 X |
| 4,033,734 | 7/1977 | Steyert, Jr. et al. | 62/3 |
| 4,069,028 | 1/1978 | Brown | 62/3 |
| 4,107,935 | 8/1978 | Steyert, Jr. | 62/3 |

*Primary Examiner*—Lloyd L. King

*Attorney, Agent, or Firm*—Norman T. Musial; John R. Manning; James A. Mackin

[57] ABSTRACT

The method of the invention employs ferromagnetic or ferrimagnetic elements, preferably of rare-earth based material, for example gadolinium, and preferably employs a regenerator. The steps of the method comprise controlling the temperature and applied magnetic field of the element to cause the state of the element as represented on a temperature-magnetic entropy diagram repeatedly to traverse a loop. The loop may have a first portion of concurrent substantially isothermal or constant temperature and increasing applied magnetic field, a second portion of lowering temperature and constant applied magnetic field, a third portion of isothermal and decreasing applied magnetic field, and a fourth portion of increasing temperature and constant applied magnetic field. Other loops may be four-sided, with, for example, two isotherms and two adiabats (constant entropy portions). Preferably, a regenerator may be employed to enhance desired cooling or heating effects, with varied magnetic fields or varying temperatures including three-sided figures traversed by the representative point.

7 Claims, 4 Drawing Figures

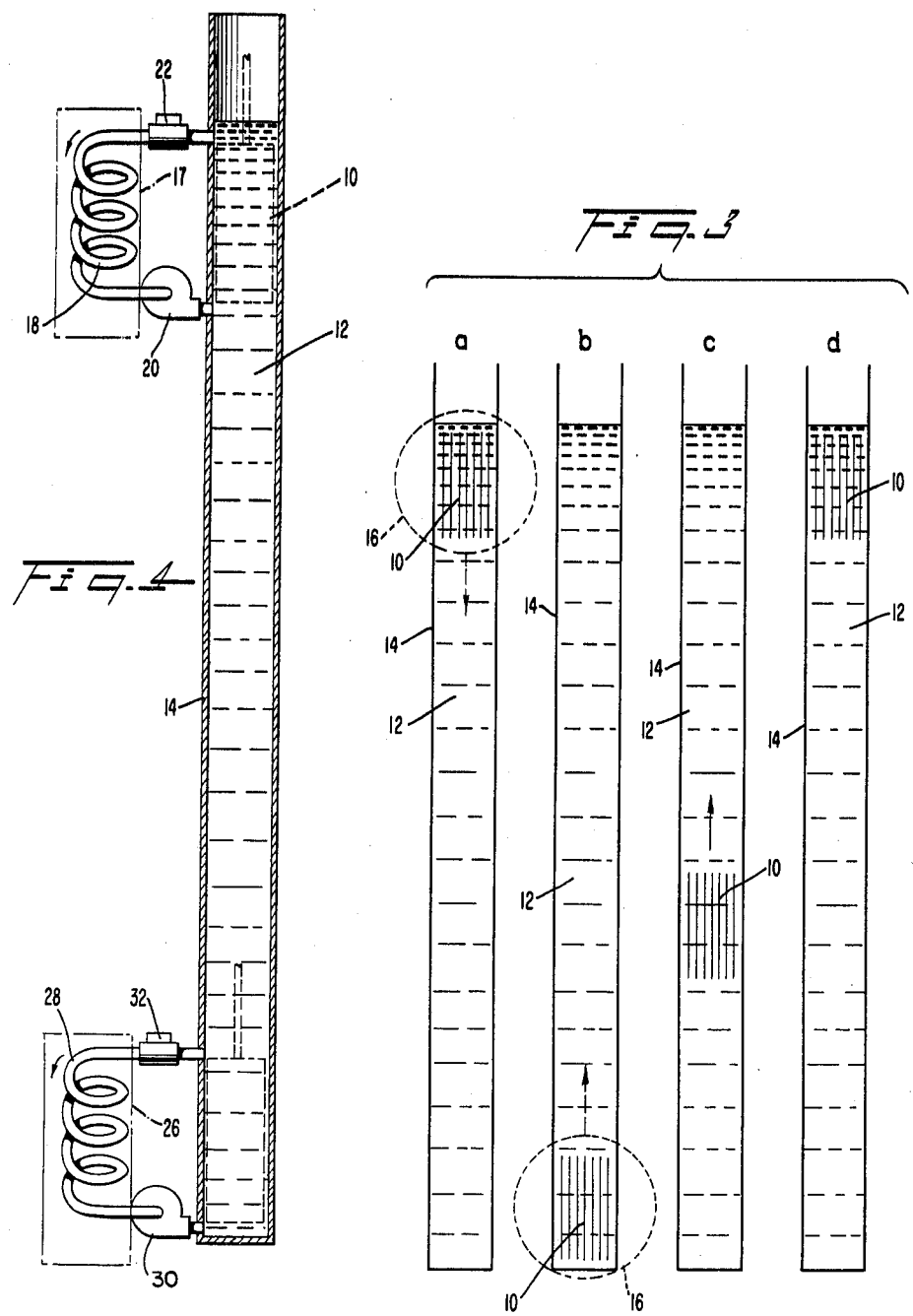

MAGNETIC HEAT PUMPING

The invention described herein was made by an employee of the U.S. Government and may be manufactured and used by or for the Government for governmental purposes without the payment of any royalties thereon or therefor.

This is a continuation of application Ser. No. 829,319, filed Aug. 31, 1977, now abandoned.

BACKGROUND OF THE INVENTION

The invention relates to magnetic heat pumping. It has been suggested heretofore to employ the heating and cooling effect of magnetization and demagnetization respectively in a cycle for pumping heat. For example, one may refer to U.S. Pat. No. 2,589,775 issued Mar. 18, 1952 to Constantin Chilowsky for a method and apparatus for refrigeration. The Chilowsky Patent further suggests employing the heating and cooling effect resulting from passing the material through the curie point or in the vicinity of the curie point in order to enhance the heating or cooling desired.

The arrangement suggested by Chilowsky because of the techniques used is not an effective method for pumping heat in the vicinity of room temperatures. Furthermore, the magnetic heat pumping apparatus of Chilowsky and of others fails to take full advantage of the pumping effect which may be obtained by changing magnetization at well separated temperatures.

Accordingly, it is an object of the invention to provide an improved method for the magnetic pumping of heat.

It is another object of the invention to provide an improved method of magnetic heat pumping which may be applicable at room temperatures and below.

SUMMARY OF THE INVENTION

According to the invention the method of pumping heat employs a ferromagnetic or ferrimagnetic element and comprises the steps of controlling the temperature and applied magnetic field of the element to cause the state of the element repeatedly to traverse an appropriate loop. For example the loop may have as an initial point a first temperature and a first value of applied magnetic field. As a first step the method may comprise changing the applied magnetic field from its first to a second value while changing the temperature from its first to a second value, then changing the field to a third value while changing the temperature to a third value, then changing the field to a fourth value while changing the temperature to a fourth value, then changing the magnetic field to its first value while changing the temperature to the first value, and then performing these steps repeatedly.

If desired the temperatures may be kept constant while changing the applied field during two of the four steps outlined in the preceding paragraph. An alternative method may be to maintain constant the magnetic entropy while changing the temperature. It is also possible to traverse repeatedly a loop having three terminal points, instead of four. Thus we may have an initial point, may have an initial value of temperature and magnetic field, thence values changed for example substantially isothermally to the same initial temperature but a different applied magnetic field, then changing both temperature and magnetic field to a third value of temperature but the initial applied field, and then maintaining the applied field constant and changing the temperature to its initial value.

Preferably the material is selected so that as the temperature changes between its highest and lowest values in traversing the loop in each direction, the material passes through or near the curie point to enhance the heating or cooling effect. The method is improved by employing rare-earth materials in the material or substance of the working element and also by employing a regenerator or recuperator.

DESCRIPTION OF THE FIGURES

The foregoing and other objects, advantages and novel features of the invention will be more fully apparent from the following description when read in conjunction with the accompanying drawings in which:

FIG. 3 comprising FIGS. 3a, 3b, 3c, and 3d, illustrates schematically the steps of one embodiment of the method of the invention using a simplified apparatus for carrying the method into effect; and FIG. 4 is a diagram illustrating schematically another apparatus for carrying the invention into effect.

DETAILED DESCRIPTION (a) Paramagnetic Materials

There are many types of heat pump cycles using a gas working fluid or a gas-liquid cycle. These cycles may be used at temperatures from around room temperature to around 0.3 degrees K. In general a gas is compressed and the heat of compression is removed or a gas is condensed to release heat. The fluid is then cooled to a temperature somewhat near that for which the refrigeration is desired such as by evaporation, passage through a counter-flow heat exchanger, or through a regenerator. Then if the fluid is still a gas, it is common to expand the gas adiabatically or through a Joule-Thomson valve in isenthalpic expansion. By a suitable heat exchanger, the fluid then absorbs heat from the load, and then returns to the compressor through the counter-flow heat exchanger or regenerator if these components are present. Some systems involve two or more stages, the splitting and recombining of streams, the use of expansion engines, the use of Joule-Thomson valves, more than one working substance, or the like, or suitable combinations. The purposes for the various systems are to improve the yield of refrigeration or of the condensed liquid, to improve efficiency, to reduce capital cost, or to reach very low temperatures.

Magnetic cycles have been used for temperatures below 4 degrees K. It has also been proposed heretofore to employ a paramagnetic working material and thermal contact with a "heat sink", e.g., liquid helium.

Figure 1:
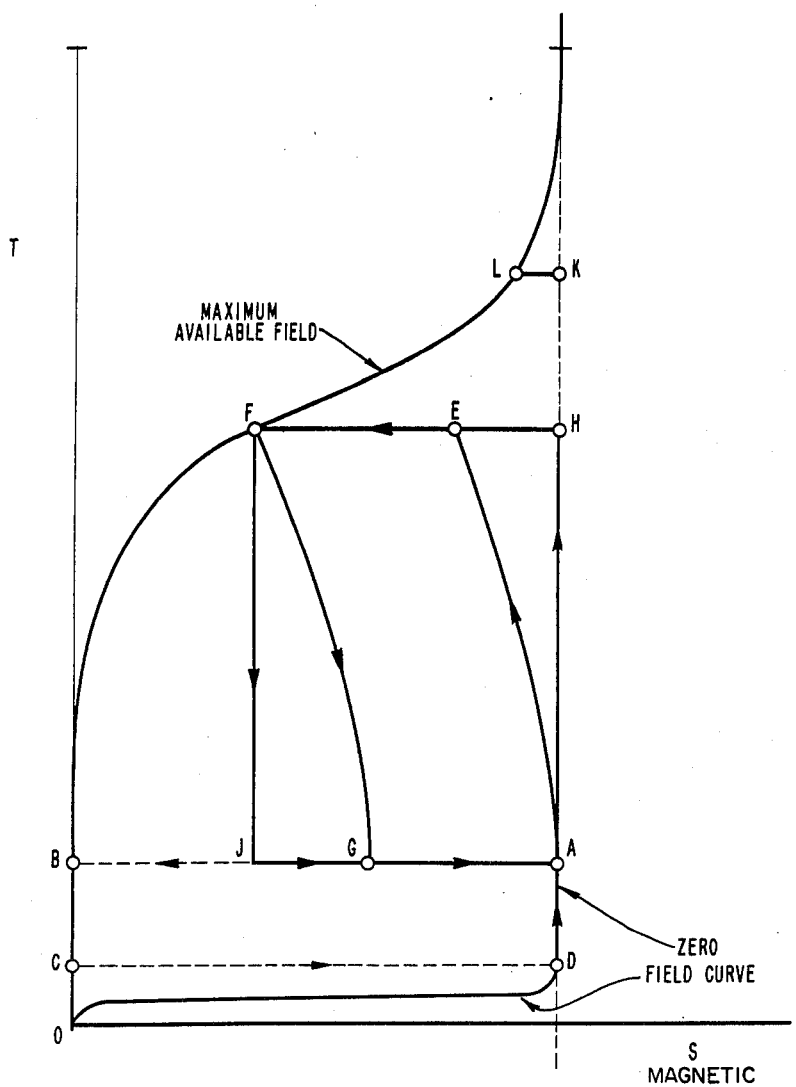
FIG. 1 is an idealized temperature-entropy diagram for a typical paramagnetic material useful in explaining prior suggestions for magnetic heat pumping.

Referring to FIG. 1, a temperature-entropy diagram of a typical paramagnetic material plots magnetic entropy on the horizontal axis and temperature on the vertical axis. The zero field curve is indicated as the curve ODAHK and is the entropy curve that corresponds to increasing temperature when zero field is applied to the magnetic material. Let the curve OCBFL represent the temperature-entropy curve for some magnetic field as large as conveniently achieved.

Suppose that we assume that the material starts at a temperature with a very small field applied corresponding to the point A. The applied magnetic field is then increased while heat is absorbed by a suitable "heat sink" and the temperature remains substantially constant, so that the material passes from the point indicated at A to the point corresponding to B. Then the working material is thermally isolated and the applied field reduced, but not to zero. Accordingly, the material passes from a state indicated at B on the diagram to a state indicated at C because the temperature drops as the magnetic field declines. At this lower temperature the working material is thermally connected or coupled to absorb heat from the load or the volume to be refrigerated, the field is reduced to zero while the temperature remains approximately the same while the load surrenders heat to the material, and the material passes from a state indicated by the point C to that at the point D. Finally, the material is again thermally isolated and the field is increased slightly to the original very small value which causes the temperature to rise to the heat sink temperature as indicated at A. At that point the cycle BCDA may begin again by further raising the field to cause isothermal rejection of heat sink as the material passes from the state indicated at A to the state indicated at B.

About 5 or 10 degrees K, the lattice heat capacity of the magnetic material begins to absorb and to reject heat as the element passes through a cycle somewhat similar to that just described. Therefore, if regeneration is not used, the capacity of the cooling cycle is not as great. Furthermore, the applied magnetic field is less effective at higher temperatures in causing temperature and entropy changes. This may be observed for example by noting that the maximum available magnetic field curve BFL in the diagram approaches closely to the zero field curve DAHK at higher temperatures as plotted so any given change in the field produces a smaller entropy change than at lower temperature. It is apparent that operation at the higher temperatures reduces the possible cooling effect.

For a heat sink temperature of 15 to 20 degrees K or so a cycle such as EFGAE may be employed. Selection of the field to be applied at points such as E and G depends on the individual material. A T-S diagram (similar to those used for gasses) can be constructed for the material from experimental measurements. The appropriate value of the intermediate field can be found from the field curves passing through E or G in the T-S diagram. The refrigeration capacity such as the length of the line GA multiplied by the temperature is reduced because the lines AE and FG are curved and partly because the entropy at point F is greater along the curve BFL as the sink temperature rises. The curvature of AE and FG is due to the fact that the lattice vibrational modes of the solid absorb heat and entropy as the temperature rises for an adiabatic process, and this is reflected by a corresponding decrease in the magnetic entropy as the temperature rises. One could improve the operation at these low temperatures by using a regenerator as suggested in U.S. Pat. No. 3,413,814 to J. R. van Geuns. If one employs a regenerator to transfer heat from the paramagnetic working material to the regenerator as the magnetic field is reduced in passing from the temperature at F to the temperature at G (or J) and then reintroduces the heat from the regenerator in traverse ions point A to the temperature at point F (or H), the cycle can be improved so that it is reflected in a temperature-entropy cycle that is more rectangular in appearance such as HEAAH. The cycle capacity is increased because more heat can be removed from the load in traversing the representational line from J to A than from G to A. Also more heat can be rejected to the heat sink in traversing the representational line from H to F than from E to F.

Nevertheless as is apparent from the diagram the temperature-entropy relations for paramagnetic materials indicate the lack of suitability of the method for a magnetic refrigeration system that operates at or near the ordinary room temperature range. The closeness of the zero field curve and the curve at some convenient maximum field strength at higher, non-cryogenic temperatures shows that such a system does not hold much promise.

(b) Ferromagnetic Materials

Figure 2:
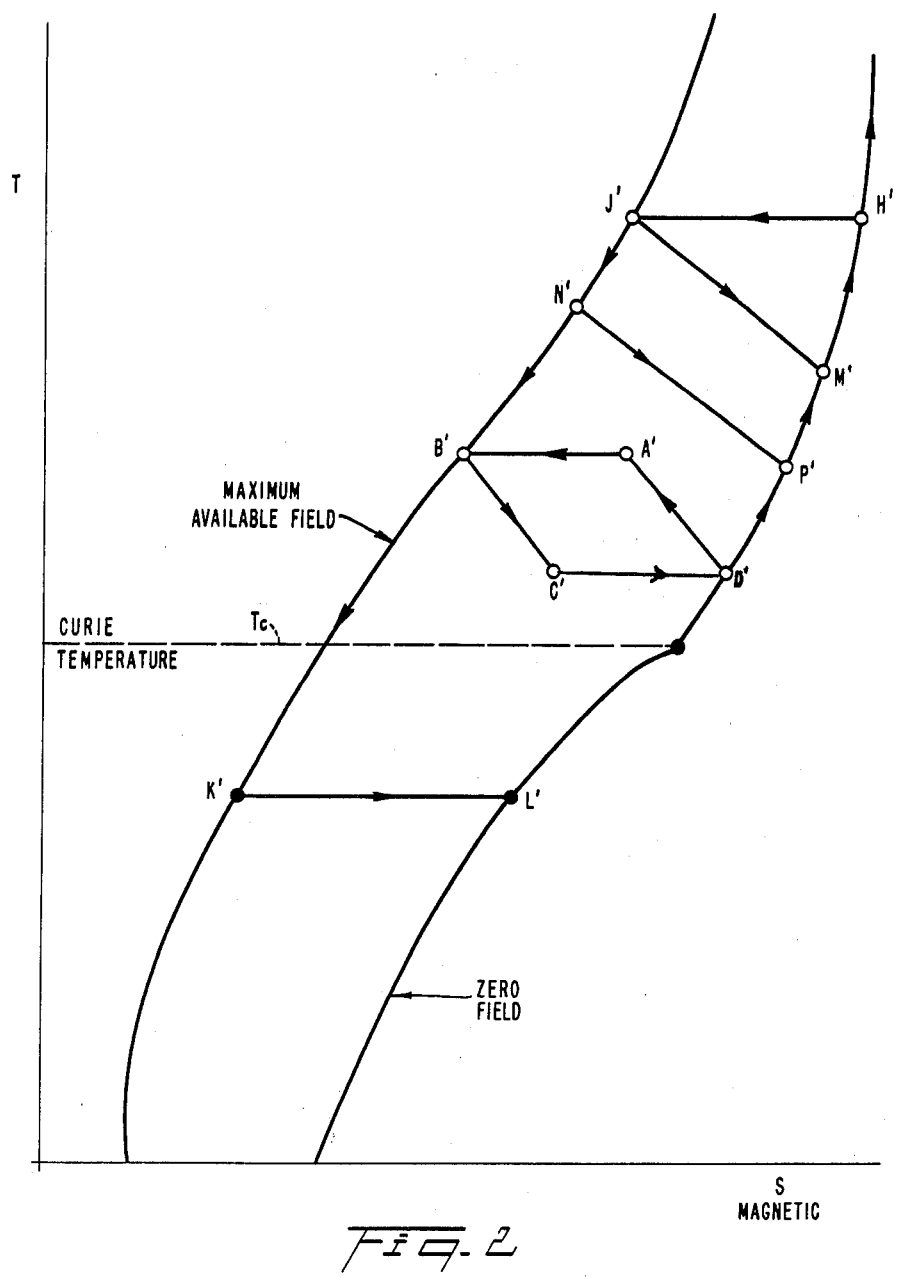
FIG. 2 is an idealized temperature entropy diagram for a ferromagnetic material useful in explaining the present invention.

Turning now to systems which involve ferromagnetic or ferrimagnetic, as opposed to paramagnetic, materials, a pair of typical, though idealized, temperature-magnetic entropy curves appear in the diagram of FIG. 2. Again the temperature is shown on a vertical axis and the magnetic entropy is shown on a horizontal axis. The Curie temperature is indicated by the temperature line $T_c$. U.S. Pat. No. 2,598,775 to C. Chilowsky for "Method and Apparatus for Refrigeration" and U.S. Pat. No. 2,619,603 to C. Chilowsky suggests the use of one or more ferromagnetic materials such as alloys, for example nickel alloys, selected to have a desired Curie temperature or temperatures. Chilowsky proposes a cascade of several alloys with graduated variations in Curie temperature to allow a larger temperature interval to be spanned by his refrigeration cycle. A single stage arrangement is not adequate because it does not permit, as described by Chilowsky, that the temperature span more than an interval of a few degrees. Moreover, when the cycle has reached a state of equilibrium more or less, only the first and the last alloys respectively in the graduated series of alloys Chilowsky uses are active in absorbing heat from a low-temperature space and rejecting heat to a high-temperature space. The intermediate alloys are required to permit the device to span a useful temperature range.

In the arrangement of the present invention, it is first proposed to use, for example, a rare-earth or a rare-earth based material which is ferromagnetic or ferrimagnetic with a Curie point in or near the temperature range covered by the cycle in a simple non-regenerative cycle. By rare-earth-based material I include any material comprising a rare-earth element. For example, one rare-earth material, the element gadolinium (Gd) has a Curie point at or near ordinary room temperature. By using a method according to the present invention a refrigeration cycle using gadolinium may span approximately 20 degrees centigrade, near room temperature with present practical field strengths. Moreover, the heat pumping capacity and single stage temperature range may be further increased by employing a regenerator so that the temperature spread beteeen the heat sink and the load may be expanded even further.

Referring to FIG. 2, assume that one started with such an element at a temperature and an applied magnetic field (chosen suitably by reference to a T-S diagram) represented by the point A' on the temperature entropy curve of FIG. 2. Assuming that the element is then in good heat transfer relationship with the heat sink, the magnetic field may be increased to some convenient, selected maximum. If the sink absorbs the heat generated, the element then assumes a state represented on the diagram by the point B'. Thereafter the element may be removed from its heat exchange relationship with the sink and then the magnetic field applied to it may be reduced until the element reaches a desired lower temperature, such as a state represented by the point C'. Now the element may be put into heat exchange relationship with the load to be cooled and assuming it absorbs heat from the load as the magnetic field is reduced further its state is changed from the state represented by the point C' to the state represented by the point D', where there is a zero field. If the field is now increased after the element as removed from heat exchange relationship with the load, the element returns to the initially described state represented by A' and the cycle may be repeated.

Several variations of the cycle are possible which allow heat to be absorbed from other than isothermal loads. For example the four corner points of a generalized repetitive loop having, respectively, magnetic field values $H_0$, $H_1$, $H_2$ and $H_3$ and temperature values $T_0$, $T_1$, $T_2$ and $T_3$. Consider $T_0$ and $H_0$ as the initial temperature and field values. Also we restrict the values so that $H_1 > H_0$ and $H_3 < H_1$, and $T_2 < T_1$ and $T_0 > T_3$. Under such a generalized loop with four designated corners, we can readily observe that a loop with isothermal lines such as illustrated in FIG. 2 for A', B', C', D', A' is a case in which $T_1 = T_0$, and $T_3 = T_2$. We can also have cases in which we may consider the four corner figure to degenerate into a three corner figure with the corner point $H_3 T_3$ equal to the corner point $H_2 T_2$; or we may have instead of one isotherm, a constant field line in which, for example, $H_3$ equals $H_0$ and the applied magnetic field remains constant as the representative point changes from $H_3 T_3$ to $H_0 T_0$, the initial point with the absorption of heat from a load.

In order to improve the capacity of a cooling cycle of this nature, one may use a method employing the concept of a regenerator. In this example, the method may be carried into effect employing apparatus illustrated in simplified form in FIG. 3. In describing FIG. 3, a different sequence will be employed from that of the nonregenerative cycle described above. The apparatus of FIG. 3 will first be described in connection with this different sequence.

Referring to FIG. 3, an magnetic field receiving component 10 formed of a rare earth or rare earth based material is divided in a suitable manner to permit the passage through it of fluid. For example, the material may be formed into rods connected together in a bundle to a suitable piston (not shown) or into a bundle of plates or into a bundle of tubes or a group of cylinders, cylindrical parts or the like. The material is immersed in a fluid 12 which in this case may be a liquid contained in a tube indicated as 14. Let us start with the element positioned as shown in FIG. 3a near the top of the tube and the liquid. A magnetic field symbolized by the dotted circle 16 is applied by any of the various known means. The resulting heat of magnetization is at the same time removed by the liquid and transferred by any of several known methods to the surroundings or to a heat sink. The material therefore undergoes a substantially isothermal change from an initial state indicated by the point H' in FIG. 2 to the point J' on the maximum-available-field curve. The magnetic field is then maintained in a substantially constant manner while the element is moved to the bottom of the regenerator. On this first cycle, assuming that the liquid 12 is initially all of one temperature, the state of the component 10 during this motion remains at point J' in the temperature entropy diagram of FIG. 1. When the material reaches the bottom of the tube or cylinder 14 (FIG. 2b), the magnetic field is removed, which causes a cooling of the element and a consequent cooling of that part of the liquid 12 which is in contact with the element, so that the state of the element 10 is then indicated by some point such as the point M' in FIG. 2. As the element thus cooled is moved (FIG. 3c) up the cylinder 14 the cold is transferred to the liquid 12. As the component 10 returns to its original position, therefore, its state is represented again by the point H' on the diagram of FIG. 2. During the following cycle, however, in which the steps are repeated, as the element lowers through the cooled liquid, it is cooled so that instead of remaining at a constant temperature, its state changes from that indicated by the point J' on the diagram of FIG. 2 to a point such as the point N' on the diagram of FIG. 2. Thereafter reducing the field causes further cooling whereby the state of the element conforms to the point P' on the diagram. Again moving the element 10 through the liquid 12 in an upward direction changes the state of the element from that indicated at P' to that indicated at H' again. The cycle may now be repeated causing successive similar loops to be traversed (the later successive loops not being indicated but embracing successively larger areas on the diagram) until the lower portion of the liquid 12 has reached a state represented by the point K', either a point of equilibrium or the point at which it is desired to extract heat from a load. As the load surrenders heat to the element and the field is removed to cause a substantially isothermal absorption of heat from the load, the state of the element changes from a point such as K' to a point indicated by L'. Thereafter, as the element moves and the magnetic field is changed, the state of the element traverses the loop H'J'K'L'H' repeatedly, transferring heat from the load to the "sink." It will be understood that the various loops and representational states are highly idealized on diagrams such as those of FIG. 2.

The liquid 12 should have a good transport characteristic with the component 10 at the same time have a good resistance to heat flow within itself so that it sustains a temperature gradient from top to bottom of the cylinder 14. Under these circumstances, the liquid 12 acts as a regenerator, the usefulness and value of which will be appreciated from consideration of the diagram of FIG. 2. While supporting a substantial heat gradient, the temperature difference between the source and the "sink" may be substantially increased and preferably may enclose in its loop the Curie temperature Tc which affords a marked efficiency in operation as compared to a loop which does not enclose the Curie temperature Tc or at least come very close to it. If desired a field strength detector may be inserted to remain with the element 10 to measure the field strength of field 16, and corrected by feedback to keep the field strength constant at the appropriate parts of a cycle requiring such control or alternatively to vary the field in any desired fashion. The possibility of varying the field in a prescribed manner permits rumerous useful variations in the cycle because all of the thermodynamic states of the component 10 which lie between the zero and high field curves in the temperature-entropy diagram (FIG. 2) are available for use in the cycle. It is for example possible to vary the field up or down in a thermodynamically reversible and continuous way at any time during the cycle. The analogous process for a gas working substance would be a continuous reversible change in pressure, up or down, which is inconvenient, if not impossible.

Referring to FIG. 4, there is illustrated a method of improving the transfer of heat to the "heat sink" and from the load. This may be accomplished by adding to the device schematically illustrated in FIG. 4 involving a pair of pumps and devices in a heat exchange relationship with the sink and the source. For example, the sink 17 may be arranged as a reservoir in heat exchange relationship to coils 18 which are then connected to the liquid 12 near the top of the cylinder 14. The pump 20 pumps liquid through the coil 18 and when operative simultaneously opens a valve 22 to pass liquid through the coil 18. A somewhat similar arrangement involves the load 26 which is arranged in heat transfer relationship with coils 28 through which liquid is pumped by the pump 30 which opens the valve 32 and circulates liquid at the lower end of the cylinder 14. It will be apparent that if the operation of the pumps 20 and 30 is appropriately and correctly phased with the position of the component 10 so that the pump 20 operates when the element 10 is at its superior position to take up heat from the element by circulating liquid between the orifices leading from the coils 18, that the transfer of heat to the sink 17 is facilitated. Similarly, if the pump 30 is operated while the element 10 is in its lower position, circulation of the fluid between the orifices leading from the coils 28 is arranged to pass through the element 10 at its lower, inferior position therefore enhancing the rapidity of heat exchange between the load 26 and the component 10. A more rapid heat exchange between the element and the load 26 and the element and the sink 17 enhances the efficiency of the arrangement.

The methods proposed may be operated in a "batch" form as illustrated in FIGS. 3 and 4 or by a continuous arrangement modifying any of the various types of magnetic refrigeration heretofore proposed. Differing types of magnets may be used, for example, any suitable type of magnet which would provide the desired types of field including superconductive magnets or even permanent magnets by moving the magnet at the appropriate times to provide the desired field strengths. Which parts move relative to which is a matter of choice. The form of the working element may be in various forms as suggested.

For example, the working material may be in the shape of a disc or cylinder and the magnet wound to provide the desired field as a function of angular position. The regenerator or regeneration may be provided by forced convection or circulation of fluid between appropriate parts of the disc or cylinder. Another arrangement may employ superconducting magnets or permanent magnets. Possibilities of varying the field as required during the cycle may involve physically moving the magnets or the working substance and the regenerator. If a superconducting magnet is used, the field could be changed electrically up to some point where coil energy losses become prohibitive. The component 10 may consist of thin plates, as already described, porous sintered-structure, small granules or pellets, or an otherwise solid mass having many fine holes or slits.

The regenerator 12 material may be water, alcohol, hydrocarbons, or some other suitable fluid which does not change phase in the temperature range of the cycle. In some low temperature ranges, the choice may be limited only to supercritical helium.

As pointed out hereinbefore, gadolinium is a suitable material to be used in the component 10 in the room temperature range. Other possible materials are other rare earth elements, intermetallic compounds and alloys containing rare earth elements, transition metal elements, compounds containing such elements, and alloys containing transition elements. Mixtures of two substances in close thermal contact may be advantageous.

Field strength detectors, any suitable known one of which may be employed, may be used to detect the strength of the field to maintain the field at a desired value. For example, such a detector may be used to control the field strength either to maintain it constant or to change it as desired. For example, the detector may be used to keep the strength at the desired constant value as illustrated between J' and K' and also to keep the strength at the desired zero field value as illustrated between the points L' and H'. Certain variations of field may be found useful and may be achieved if deemed desirable.

It is apparent that instead of operating as a refrigerator, the method may operate as a heater.

In some temperature ranges, e.g., below 80° K. or so, there may be no suitable liquid substance which remains liquid over the desired temperature range. In such a range a "gas" at supercritical pressure, e.g. He gas at 200-400 p.s.i. can be used. The pressure is required to raise the density and hence the heat capacity per unit volume of the gas.

A further explanation and description of my invention, particularly as to theory, may be found in my paper published in the Journal of Applied Physics, Vol. 47, No. 8, August 1976, pp. 3673 to 3680.

What is claimed is:

1. A magnetic heat pump comprising:
    a working component which is essentially a single ferromagnetic or ferrimagnetic material selected from the group consisting of rare earth elements and intermetallic compounds and alloys containing rare earth elements;
    means for subjecting said component successively to a magnetic field to first, second, third and fourth strengths, and then back to said first strength; and,
    means for changing said element successively from a first to a second temperature, then to a third temperature; then to a fourth temperature; and then back to said first temperature, said first, second, third and fourth temperatures coinciding with said first, second, third and fourth strengths of said magnetic field.

2. The apparatus as claimed in claim 1, in which said first and second temperature are the same whereby heat is rejected by said element in a substantially isothermal manner as the magnetic field applied to said element is changed from first to second strength.

3. The apparatus as claimed in claim 1, in which said third temperature equals said fourth temperature whereby heat is absorbed by said element in a substantially isothermal manner as the magnetic field applied to said element is changed from third to fourth strength.

4. The apparatus as claimed in claim 1 including means whereby said element is thermally isolated during the change from said second to said third temperature.

5. The apparatus as claimed in claim 4, in which said component is thermally isolated during the change from said fourth to said first temperature.

6. The apparatus as claimed in claim 4 in which heat is absorbed by said element during the change from said fourth to said first temperature.

7. The apparatus as claimed in claim 1 in which the Curie temperature of said component is in or near the temperature range between said first and fourth temperatures.

* * * * *